United States Patent
Singh et al.

(10) Patent No.: US 9,699,656 B2
(45) Date of Patent: Jul. 4, 2017

(54) SYSTEMS AND METHODS OF AUTHENTICATING AND CONTROLLING ACCESS OVER CUSTOMER DATA

(71) Applicant: Tata Consultancy Services Limited, Mumbai (IN)

(72) Inventors: Harbhajan Mohan Singh, Chennai (IN); Jayasekar Mani, Chennai (IN); Sureshbabu Ponnan, Chennai (IN); Padmanaban Vadivel, Chennai (IN)

(73) Assignee: Tata Consultancy Services Limited (IN)

( * ) Notice: Subject to any disclaimer, the term of this patent is extended or adjusted under 35 U.S.C. 154(b) by 0 days.

(21) Appl. No.: 15/058,930

(22) Filed: Mar. 2, 2016

(65) Prior Publication Data
US 2017/0026830 A1    Jan. 26, 2017

(30) Foreign Application Priority Data

Jul. 20, 2015 (IN) .......................... 2733/MUM/2015

(51) Int. Cl.
*H04M 1/66* (2006.01)
*H04W 12/06* (2009.01)
*H04L 29/06* (2006.01)
*H04W 4/02* (2009.01)
*G06Q 10/10* (2012.01)
*H04W 12/02* (2009.01)
*H04W 12/04* (2009.01)

(52) U.S. Cl.
CPC .......... *H04W 12/06* (2013.01); *G06Q 10/105* (2013.01); *H04L 63/083* (2013.01); *H04L 63/0838* (2013.01); *H04L 63/0853* (2013.01); *H04L 63/107* (2013.01); *H04L 63/108* (2013.01); *H04W 4/02* (2013.01); *H04W 12/02* (2013.01); *H04W 12/04* (2013.01); *H04L 2463/082* (2013.01)

(58) Field of Classification Search
CPC .... H04W 12/06; H04W 4/02; H04L 2463/082
USPC .................. 455/10, 411, 414.1, 422.1, 456.1
See application file for complete search history.

(56) References Cited

U.S. PATENT DOCUMENTS

| | | | |
|---|---|---|---|
| 9,215,075 B1* | 12/2015 | Poltorak | H04L 63/04 |
| 2007/0250920 A1 | 10/2007 | Lindsay | |
| 2008/0242279 A1* | 10/2008 | Ramer | G06F 17/30864 |
| | | | 455/414.2 |
| 2013/0061307 A1 | 3/2013 | Livne | |
| 2015/0147970 A1* | 5/2015 | Tan | H04W 12/08 |
| | | | 455/41.2 |

* cited by examiner

*Primary Examiner* — Nghi H Ly
(74) *Attorney, Agent, or Firm* — Finnegan, Henderson, Farabow, Garrett & Dunner, L.L.P.

(57) ABSTRACT

Method and system for authenticating and controlling access to customer data is disclosed. Initially, a mobile agent raises a login request and a customer raises an authentication request through a pre-installed mobile application available on agent device and customer device. The unique identification details of customer device and agent device are stored on the system. The system performs a location match between the customer device and agent device thereafter a session key is generated. The session key is sent in parts to the customer device and mobile devices wherein at the time of authentication of agent device, the system performs a location match, session key match and identification detail match.

18 Claims, 7 Drawing Sheets

SYSTEMS AND METHODS OF AUTHENTICATING AND CONTROLLING ACCESS OVER CUSTOMER DATA

CROSS-REFERENCE TO RELATED APPLICATIONS AND PRIORITY

The present application also claims benefit from Indian Complete Patent Application No. 2733/MUM/2015, filed on Jul. 20, 2015, the entirety of which is hereby incorporated by reference.

TECHNICAL FIELD

The present invention relates to a system and method for authenticating and controlling access to customer data. More particularly, the invention provides a system and method for maintaining privacy and to restrict access to customer data.

BACKGROUND

In this information driven world, the accepted means of access and authentication involves pre-determined factors such as passwords, smart card access etc. and such means are inevitable to maintain security. The process of discrimination through the usage of pre-determined factors in series and/or parallel between an authorized customer and an unauthorized customer is broadly referred to as authentication. Authentication can be a single factor, two factor or multi factor process wherein the process is aimed at preventing the illegitimate access to unauthorized customers in relation to secured and sensitive information.

Commonly used authentication method includes usage of passwords, smart cards, biometric based authentication and other known methods. However, these methods are always subjected to limitations such as requiring physical presence of customer in case of biometric system, misplacement and/or duplication of smart cards and the password based system suffers from a litany of issues ranging from customer forgetting the password, customer using the same string password with multiple accounts and storage/sharing of passwords at insecure servers/locations.

Other methods are available such as authentication through a static password (set up by the customer) and a dynamic password provided on a security token (a small hardware device with a screen which displays a seemingly random number that changes periodically). Such methods suffer from the drawback of infrastructure cost required to implement the system and the inconvenience to a customer in having to retrieve a token and transcribe a code every time a login is required.

Furthermore, the number of incidents have gone up wherein customer information is leaked in the public domain and exposes the risk of abuse of such information in present and future times. Thus, there exists a need for a system that controls the access to customer data without significantly burdening the customer while, at the same time, eliminating the need for complicated infrastructure implementations.

SUMMARY

This summary is provided to introduce aspects related to systems and methods for controlling access of mobile agent to customer data, and the aspects are further described below in the detailed description. This summary is not intended to identify essential features of the claimed subject matter nor is it intended for use in determining or limiting the scope of the claimed subject matter.

In view of the foregoing (para [0007]), an embodiment herein provides a computer implemented method for conducting a card-less banking transaction with a user device. In an embodiment, a computer implemented method for authenticating and controlling access to customer data by a mobile agent is provided. The method may include receiving by a mobile application management module a mobile agent login request from an agent device and a customer authentication request from a customer device wherein unique identification data of agent device and customer device is pre-stored with the agent device and customer device provided with a pre-installed mobile application, receiving by a location match module geo-spatial location of agent device and customer device and thereafter performing a location match; generating by a session key generator module, a session key which is valid for pre-determined duration of a meeting session and dividing the session key into two parts wherein one part is sent to the agent device and other part to the customer device wherein the session key is generated and sent only if location match is found between the agent device and customer device; entering the received parts of session key into agent device and customer device by mobile agent and customer respectively and comparing by a session key verification module, the entered session key with the generated session key by the session key generator module; comparing the entered session key with the generated session key, comparing by an ID match module, the unique identification data of agent device and customer device stored with identification data of agent device and customer device used for entering the session key; granting access by an access module to mobile agent through agent device only if the location match, session key match and identification data match for the agent device and customer device is found.

In an embodiment, a computer implemented system for authenticating access to customer data by mobile agent is provided. The system may include one or more processors and a memory storing processor-executable instructions that, when executed by the one or more processors, configure the one or more processors to: receive by a mobile application management module, mobile agent login request from an agent device and a customer authentication request from a customer device using a pre-installed mobile application wherein unique identification data of agent device and customer device is pre-stored; receive by a location match module, geo-spatial location of the agent device and the customer device and performing geo-spatial location match for the agent device and the customer device; generating by a session key generator module, a session key which is valid for pre-determined duration of a meeting session and dividing the session key into two parts wherein one part is sent to the agent device and other part to the customer device wherein the session key is generated and sent only if location match is found between the agent device and customer device; entering the received parts of session key into agent device and customer device by mobile agent and customer respectively and comparing by a session key verification module, the entered session key with the generated session key by the session key generator module; comparing by an ID match module, the unique identification data of agent device and customer device stored with identification data of agent device and customer device used for entering the session key; granting access by an access module to mobile agent through agent device only if the location match, session key match and identification data match for the agent device and customer device is found.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed. In the drawings.

DETAILED DESCRIPTION

Exemplary embodiments are described with reference to the accompanying drawings. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The words "comprising", "having", "containing", and "including", and other forms thereof, are intended to be equivalent in meaning and be open ended in that an item or items following any one of these words is not meant to be an exhaustive listing of such item or items, or meant to be limited to only the listed item or items.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described. In the following description for the purpose of explanation and understanding reference has been made to numerous embodiments for which the intent is not to limit the scope of the invention.

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the attrition warning system and method may be stored on, distributed across, or read from other machine-readable media.

Figure 1:
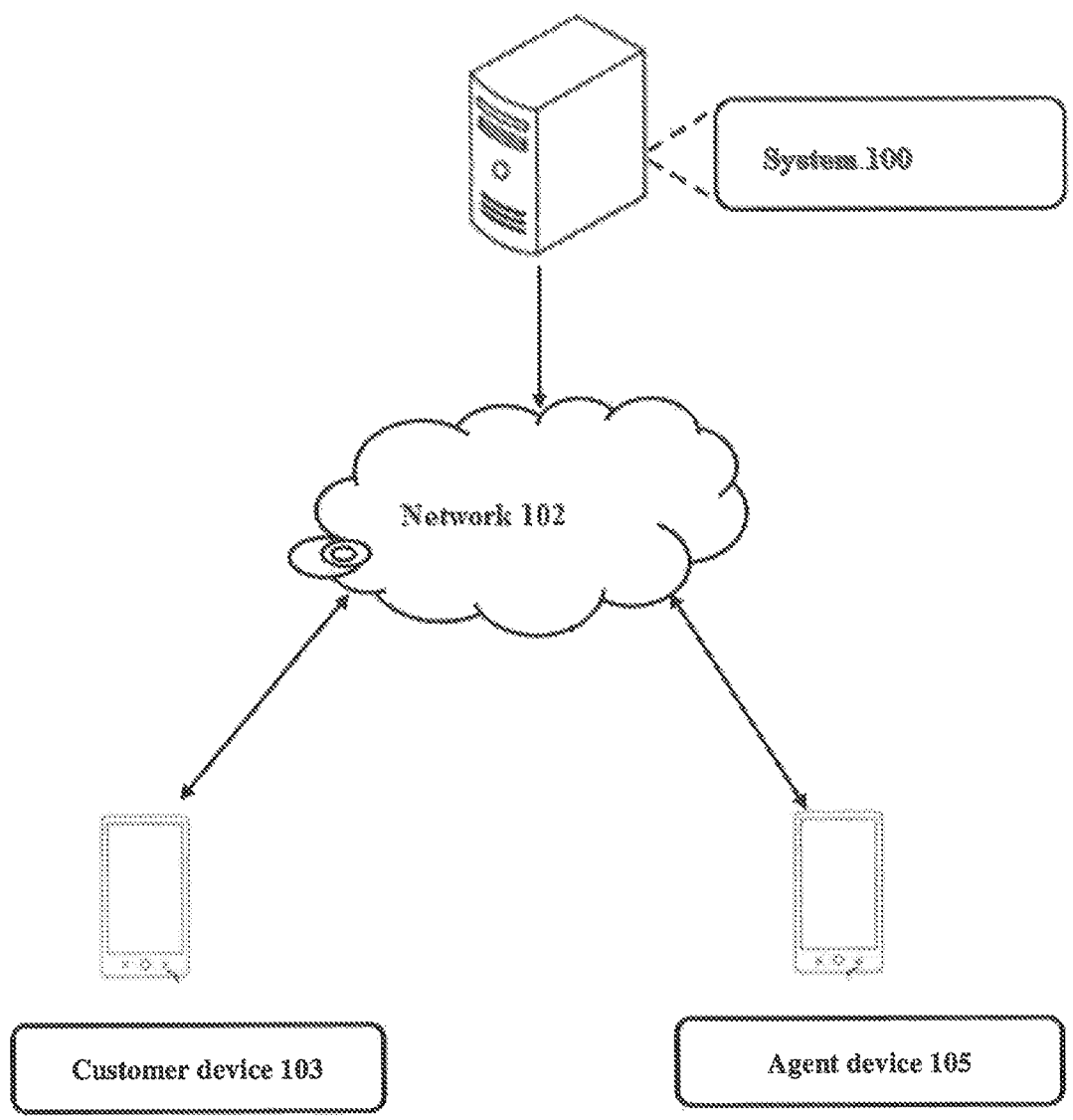
FIG. 1 illustrates a network implementation of a system for controlling access of a mobile agent to customer data, in accordance with an embodiment of the present disclosure.

FIG. 1 illustrates a block diagram depicting the architecture of a system for authenticating and controlling access of a mobile agent to customer data, in accordance with an embodiment as disclosed herein. As depicted, the system 100 for controlling and authenticating access of a mobile agent to customer data is connected to a customer device 103 and an agent device 105 through a communication network 102.

The customer device 103 and agent device 105 can be any type of portable personal device capable of independently communicating with the communication network 102 (hereinafter referred to as network) and includes without limitation a handheld mobile phone (e.g., iPhone™ or Android™ smart phones), a handheld mobile device (e.g., iPod Touch™), a tablet (e.g., iPad™), a PDA, a notebook computer, a personal data assistant (PDA) or the like. The network 102 provides voice and messaging capabilities and may provide access to other communication networks such as, for example, other mobile communications networks and/or the Internet. The network 102 includes without limitation any type of wireless communication network such as CDMA, GSM and other satellite based networks.

The System 100 may be implemented in any of a variety of conventional computing devices, including, for example, servers, a desktop PC, a notebook or portable computer, a workstation, a mobile computing device, an entertainment device, and an internet appliance. It is also appreciated that the system 100 may be accessed by multiple customers and mobile agents through one or more customer devices 103-1, 103-2 . . . 103N and 105-1, 105-2 . . . 105-N or applications residing on customer device 103 and agent device 105 respectively.

In one embodiment, the network 102 may be at least one of a wireless network and a wired network. The network 102 can be implemented as one or more of the different types of networks, such as intranet, local area network (LAN), wide area network (WAN), the Internet, etc. The network 102 may either be a dedicated network or a shared network. The shared network may represent an association of the different types of networks that use a variety of protocols (e.g., Hypertext Transfer Protocol (HTTP), Transmission Control Protocol/Internet Protocol (TCP/IP), Wireless Application Protocol (WAP), etc.) to communicate with one another.

Further, the network 102 may include a variety of network devices, including, for example, routers, bridges, servers, computing devices, storage devices, etc.

Figure 2:
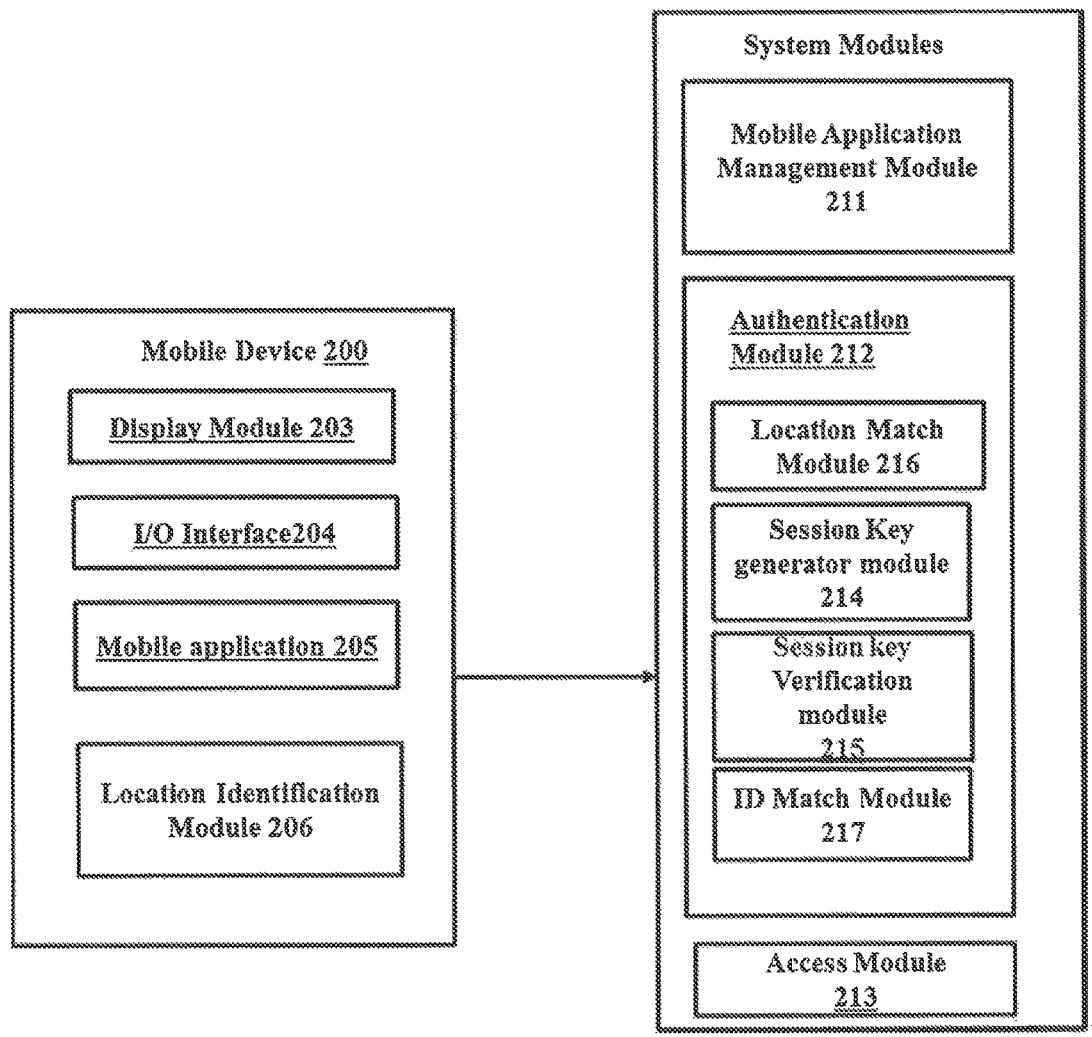
FIG. 2 illustrates a block diagram of a mobile device (e.g., customer device and/or agent device) and system modules in accordance with an embodiment of the present disclosure.

FIG. 2 illustrates a block diagram of a mobile device (e.g., customer device and/or agent device) and system modules according to an embodiment disclosed herein. The mobile device 200 herein refers to the customer 103 and agent device 105 and includes without limitation an inter-connect connecting a network interface module (not shown in drawings), a display module 203, an I/O interface 204 such as keypad and/or screen of mobile device 200, a mobile application 205, a location identification module 206, a memory (Not shown in drawings), a processor (Not shown in drawings) that, inter-alia executes the mobile application 205.

The location identification module 206 is configured to identify the geo-spatial location of mobile device 200 through the network 102. In an embodiment, the location identification module 206 includes built in Global positioning system (GPS) and communicates its respective location to the network 102 periodically or continuously. In an embodiment, the geo-spatial location can be determined through other known methods in prior art without limiting the scope of this invention. The access related requests may be entered into the mobile application 205 through the I/O interface 204. The display module 203 is configured to display interfaces based on requests raised and responses received through the mobile application 205.

Referring to FIG. 2, the system modules comprises mobile application management module 211, an authentication module 212 and an access module 213. The mobile application management module 211 enables a downloaded mobile application 205 to be registered with unique identification data. The unique identification data includes device information and user related information. The device information includes the IMEI (international mobile equipment identity) number, SIM number, IMSI number (international mobile subscriber identity) any other details associated with the mobile device 200.

In an embodiment, the user may be a customer and/or a mobile agent. In an embodiment, the user information relates to customer information and includes without limitation, registered address details, account summary, transaction details and other details as voluntary provided by the customer. In an embodiment, the user information relates to mobile agent information and includes without limitation, name and address of agent, skill and expertise and total experience and any other information which might be desired for scheduling a meeting with the customer.

The mobile application management module 211 enables the receipt of requests sent by the mobile device 200. In an embodiment, the mobile device 200 is a customer device 103 and the request includes an authentication request. In another embodiment, the mobile device 200 is an agent device 105 and the request includes a login request.

The authentication module 212 includes a location match module 216, session key generator module 214, session key verification module 215, and ID match module 217. The authentication module 212 matches a plurality of parameters such as session key, location and unique identification details and validates the access. The location match module 216 identifies the geo-spatial location of mobile device 200 by syncing with location identification module 206 of respective customer device 103 and agent device 105 and matches the locations for a possible match.

The session key generator module 214 generates one or more one time session keys during the on-going authentication process. The session key generator module 214 communicates with the customer device 103 and agent device 105 and sends divided parts of session key to the customer device 103 and agent device 105. In an embodiment, the session key may be a code, PIN, a one-time passcode (OTP), a digital signature, a key, a secret, a datum, a signal, a machine identifier or other dynamic value. In an embodiment, the session key is divided into at least two parts and sent as divided parts to the customer device 103 and agent device 105. In an embodiment, the session key may be an even numbered alphanumeric and/or alphabetical string divided into two equal halves. In another embodiment, the session key may be an odd numbered alphanumeric and/or alphabetical string divided into two unequal halves.

The session key verification module 215 is configured to retrieve the entered session key by the customer and mobile agent and to compare the entered session key with the generated session key. The session key verification module 215 is configured to compare the session key by collating the divided parts of session key as entered by the customer and mobile agent and running a sequence match with the generated session key.

The ID match module 217 receives the identification details from mobile device 200 and matches them with the unique identification data. The identification details of mobile device 200 (customer device 103 and agent device 105) used for entering the divided parts of session key is compared to the unique identification data stored.

The access module 213 enables access to secured data by mobile agent and such access module keeps a track of the duration of meeting session scheduled between the customer and mobile agent. The access module 213 is configured to enable access of mobile agent to secured data in the event of success of all the authentication matches configured to be performed by authentication module 212.

The customer device 103 and agent device 105 maintain a connection with the network 102 through procedures executed within the customer device 103 and agent device 105 respectively (discussed in detail above). The network 102 keeps a constant track of the geo-spatial location of the customer device 103 and agent device 105 in real time or near time. For the purpose of this invention, it is assumed that the customer and the mobile agent carry the customer device 103 along as the customer and mobile agent move from point to point.

The customer for scheduling an appointment with one of the mobile agent (not selected yet) opens a banking mobile application 205 (hereinafter referred to mobile application 205) on customer device 103 and raises a request for scheduling an appointment with one of the mobile agent. It should be noted that there are various methods known in the prior art for scheduling an appointment between a customer and mobile agent, however, the present invention is not directed to any such known processes in domain.

In an embodiment, the banking mobile application 205 running on customer device 103 implements one or more tools without limitation to secure data that may be stored, request for scheduling a meeting with mobile agents and other services needed for maintaining the customer accounts. The mobile application 205 can be executed on the customer device 103 wherein the mobile application 205 is hosted and operated by system 100 (either independently or through a third-party) for use by its customers and mobile agents over through the network 102. In an embodiment, the mobile application 205 is accessible through an API accessible over the Web (or other network).

In furtherance, the mobile application 205 executed on agent device 105 implements one or more tools that may be in addition to the tools implemented on the customer device 103. The tools include without limitation the ability to access the customer data stored on system 100, multi-factored authentication to gain access to customer data, respond to customer's request for meeting appointments. In an embodiment, the mobile application 205 running on agent device 105 can be remotely locked through the authentication module 213. The mobile application 205 is provided as hosted services enabling central monitoring and management of all security aspects of the service hosted by system 100.

Customer Appointment Request and Management

In one implementation, the customer requests for an appointment (herein after referred to as service request) through the mobile application 205 on the customer device 103. In an embodiment, the service request without limitation includes the details of desired time and place of appointment, agenda behind such appointment and advisory related matters. The mobile application 205 on the customer device 103 is in sync with the system 100 through the network 102. The mobile application 205 obtains the current geospatial location of customer device 103, either from the customer device 103 itself through the location identification module 206, or from the network 102, and transmits the location to the system 100.

The system 100 identifies a mobile agent from the list of plurality of mobile agents on the basis of the service request generated from the customer end. In an embodiment, the system 100 allocates a mobile agent the task of attending the service request generated by the customer. The mobile agent travels to the location as mentioned in the service request to attend the customer. It should be noted that this particular invention is not aimed towards scheduling and allocating a mobile agent from plurality of mobile agents on the basis of service request generated by customer.

Mobile Agent Login and Authentication

Figure 3:
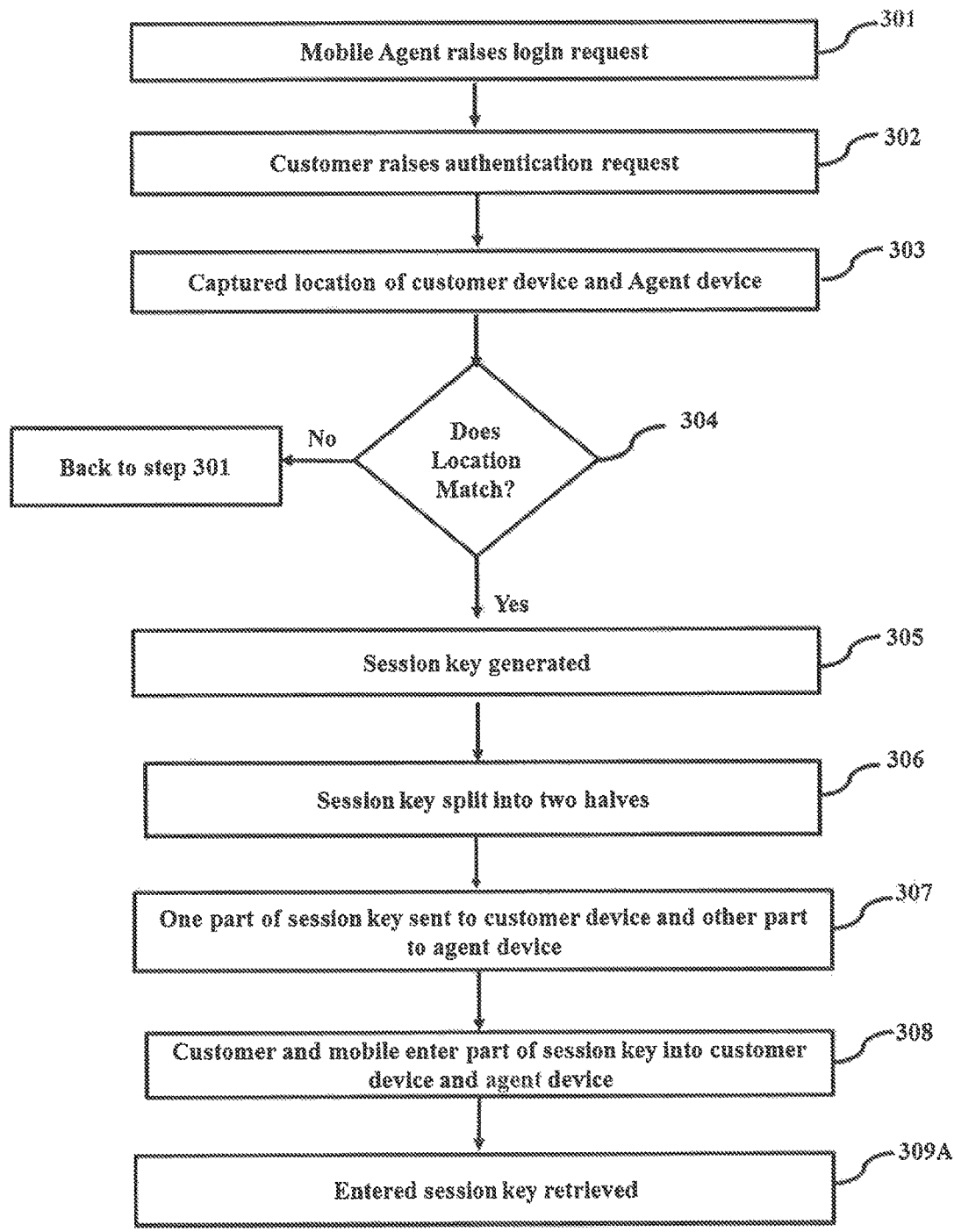
FIG. 3 illustrates a flow diagram depicting the mobile agent login and authentication process in accordance with an embodiment of the present disclosure.
Figure 3:
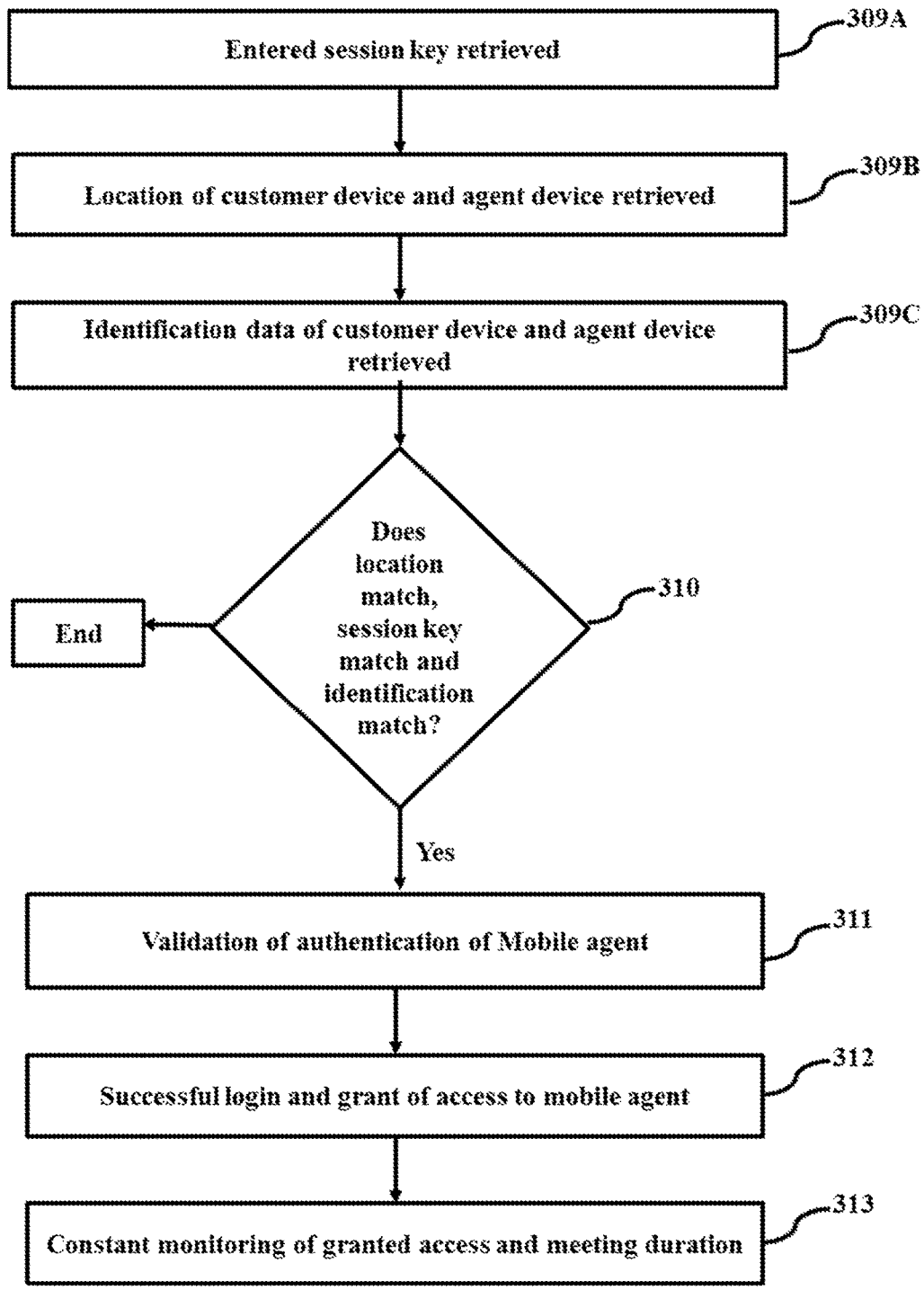

In one implementation as illustrated in FIG. 3, at step 301, the mobile agent to gain access to customer data raises a login request through the mobile application 205 on agent device 105. In continuation, at step 302, the customer also raises an authentication request for authorizing access of mobile agent to customer data through customer device 103. The login request by mobile agent and authentication request from customer should be raised simultaneously or with transient delay. The login request of mobile agent 104 and authentication request of customer 100 are transmitted to the mobile application management module 211 wherein these requests are perceived as individual requests from the customer device 103 and agent device 105.

At step 303, the location match module 216 captures the geospatial location of both customer and mobile agent through customer device 103 and agent device 105 respectively. At step 304, the location match module 216 compares the customer location with the agent location as captured by tracking the customer device 103 and agent device 105, in case the match fails at step 304, the mobile agent and customer are recommended to go back to Step 301.

In an embodiment, a new session key is generated every time the mobile agent raises the login request and the customer raises authentication request respectively and simultaneously and the authentication module 212 will validate the session key in all events of login attempts by mobile agent on the system 100 to access the customer data.

At step 305, the location match module 216 finds a match between the geospatial location of both customer and mobile agent through respective customer device 103 and agent device 105, a session key is generated by session key generator module 214. The generated session key is valid only for the duration of scheduled meeting between the customer and mobile agent. The session key is generated to identify and authenticate the login of mobile agent on the system 100.

Post the generation of session key at Step 305, the session key generator module 214 divides the session key into two halves at step 306. At step 307, the session key generator module 214 sends first part of divided session key to the customer through the customer device 103 and the other half to the mobile agent through the agent device 105. In another embodiment, the session key generator module 214 sends first half of the session key to the agent device 105 and the other half of the session key is sent to the customer device 103. In an embodiment, the session key generator module 214 shares the divided session key with agent device 105 and customer device 103 through instant messaging, text messaging or any other available means of communication. In an embodiment, the respective divided session key is shared with the customer device 103 and agent device 105 through the communication number stored and registered as part of unique identification data.

At step 308, the part of divided session key received at the customer device 105 is entered as input into the mobile application 205 pre-installed at the customer device 103. The other part of divided session key received at agent device 105 is entered as input into the mobile application 205 pre-installed at the agent device 105. At 309A, the entered session key is retrieved by session key verification module 215. At step 309B, the location match module 216 captures the location of customer device 103 and agent device 105. At Step 309C, the ID match module 217 retrieves the identification data of customer device 103 and agent device 105 used for entering the session key.

At Step 310, the session key verification module 215 compares the entered session key with the generated session key by running a sequence match. In addition to the session key verification module 215 validating the entered session key, the location match module 216 checks for the location match between the customer and the mobile agent by tracking respective customer device 103 and agent device 105. Furthermore, the ID match module 217 matches the unique identification data stored in respect of customer device 103 and agent device 105 with the respective customer device 103 and agent device 105 used for entering the session key.

As illustrated in FIG. 3 at step 310, In the event that the authentication module 212 inter-alia, session key verification module 215, location match module 216 and the ID match module 217 fails to find conformity between any or all of the location match, session key match and unique identification data match due to factors not limited to and including input of wrong session key and/or mismatch of location of mobile agent and customer and/or mismatch of identification data of customer device 103 and agent device 105 with the unique identification data, the authentication module 212 will cause a failure in the validation of login request of mobile agent and subsequent grant to access, credentials and privileges would be denied. In such an event, the mobile agent would be forced to re-login.

At step 311, the session key verification module 215, location match module 216 and the ID match module 217 find conformity between all of the location match, session key match and unique identification data. Due to conformity of the match at step 311, successful validation is confirmed. At Step 312, the access module 213 enables successful login of the mobile agent and grants access and transfers credentials and privileges which are locally cached on the agent device 105.

At step 313, the access module 213 monitors access, credentials and privileges granted to the agent device 105 and keeps constant track of the meeting duration for which such access is granted.

On-Going Meeting Checks

Figure 4:
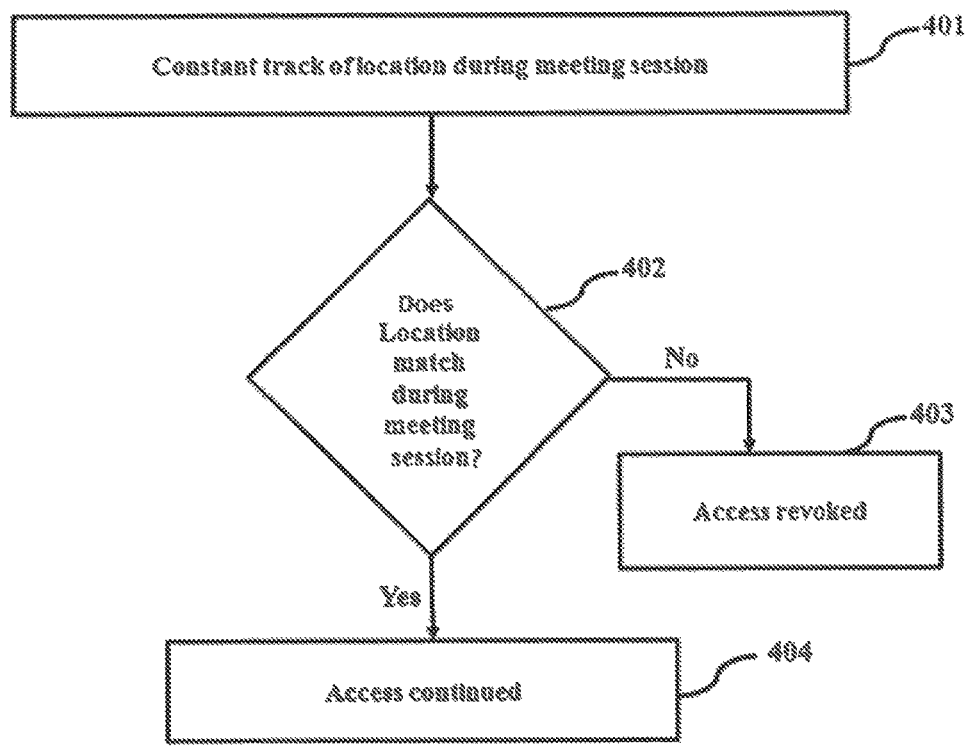
FIG. 4 illustrates a flow diagram depicting the process of controlling the access of mobile agent during the meeting session in accordance with an embodiment of the present disclosure.
Figure 5:
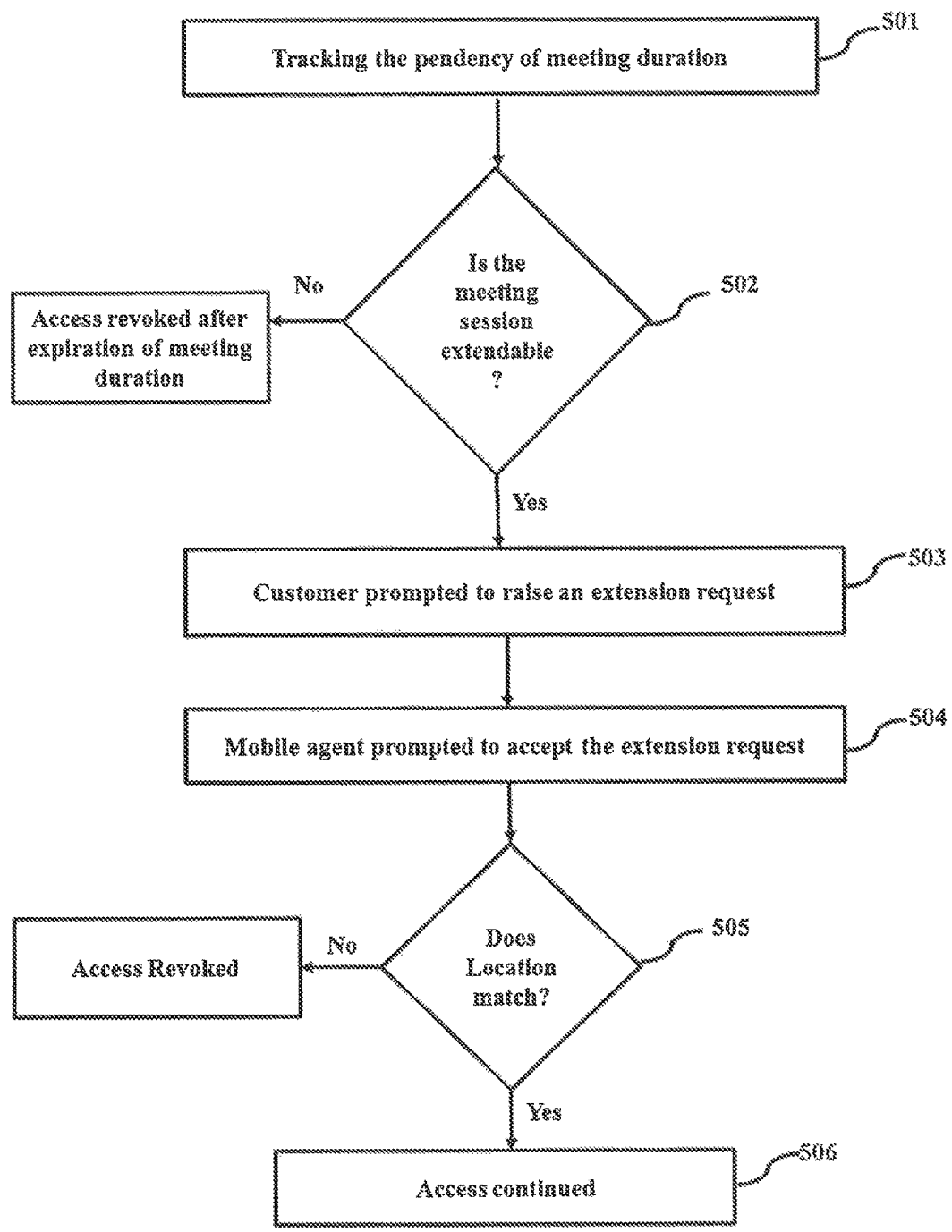
FIG. 5 illustrates a flow diagram depicting the process of controlling the access of mobile agent in the event of expiration of meeting session in accordance with an embodiment of the present disclosure.

As illustrated in FIG. 4, at step 401, location match module 216 monitors periodically the geospatial location of the customer and mobile agent through the customer device 103 and agent device 105 respectively during the pendency of meeting session. The periodic monitoring is configured to ensure maximum level of security for the customer data and avoid events of data theft if any. The periodic monitoring is performed in an automated manner and such monitoring is done within the duration of meeting session wherein the every monitoring event is separated by predetermined time interval.

At step 402, the location match module 216 fails to find a match between the locations identified for customer and mobile agent through customer device 103 and agent device 105 respectively. At step 403, due to failure of location match, the access module 213 revokes access, credentials and privileges granted to the agent device 103.

If at step 402, the location match module 216 finds a match between the locations identified for customer and mobile agent through customer device 103 and agent device 105 respectively. At step 404 the access module 213 continues the access, credentials and privileges granted to the agent device 105.

Expiration of Meeting Session

As stated before, the session key is valid only for the duration of meeting session scheduled between the customer and mobile agent. As earlier described as the supporting description for FIG. 3, continued throughout the pendency of meeting session between customer and mobile agent, at step 501, the access module 213 keeps a constant check to determine if the meeting session is expiring. At Step 502, the access module 213 determines the duration of meeting session nearing expiration, the access module 213 performs a check to determine if the meeting session is extendable. At step 503, the access module 213 determines that the meeting session is found extendable and the customer is prompted to raise a request in order to extend the meeting session. At step 504, the access module 213 prompts the mobile agent to acknowledge the extension request raised by the customer.

At step 505, the location match module 215 performs a location match between customer and mobile agent. At Step 506, the location module 215 finds a match between customer and mobile agent and the access module 213 continues the mobile agent access to customer data during extended period. In the event if the location match module 215 fails to find a match between customer and mobile agent and the access module 213 revokes the access of mobile agent to customer data during extended period.

It should be noted that during the extended duration of meeting session between customer and mobile agent, the location match module 216 periodically monitors the location of customer and mobile agent through customer device 103 and agent device 105 respectively and performs a location match. If anytime during the continuation of extended meeting session if the location match module 216 identifies a location mismatch between the customer and mobile agent, the session terminates and access of mobile agent to customer data is revoked instantly. In the otherwise scenario, the access is not revoked and meeting session continues till the expiration of meeting session duration subjected to continuous location match checks as carried out by the location match module 216.

Due to continuous checks on the access of customer data, even in any event of customer and/or agent misplacing or losing (or getting stolen) the customer device 103 and/or agent device 105 respectively, no confidential data can be recovered as no data is stored on the respective devices. Thus, in one implementation, sensitive information (e.g., banking account numbers, credit card account numbers, expiry dates, and so on) are never stored on the mobile communication device. This reduces risk and exposure of the customer's private information and data.

Figure 6:
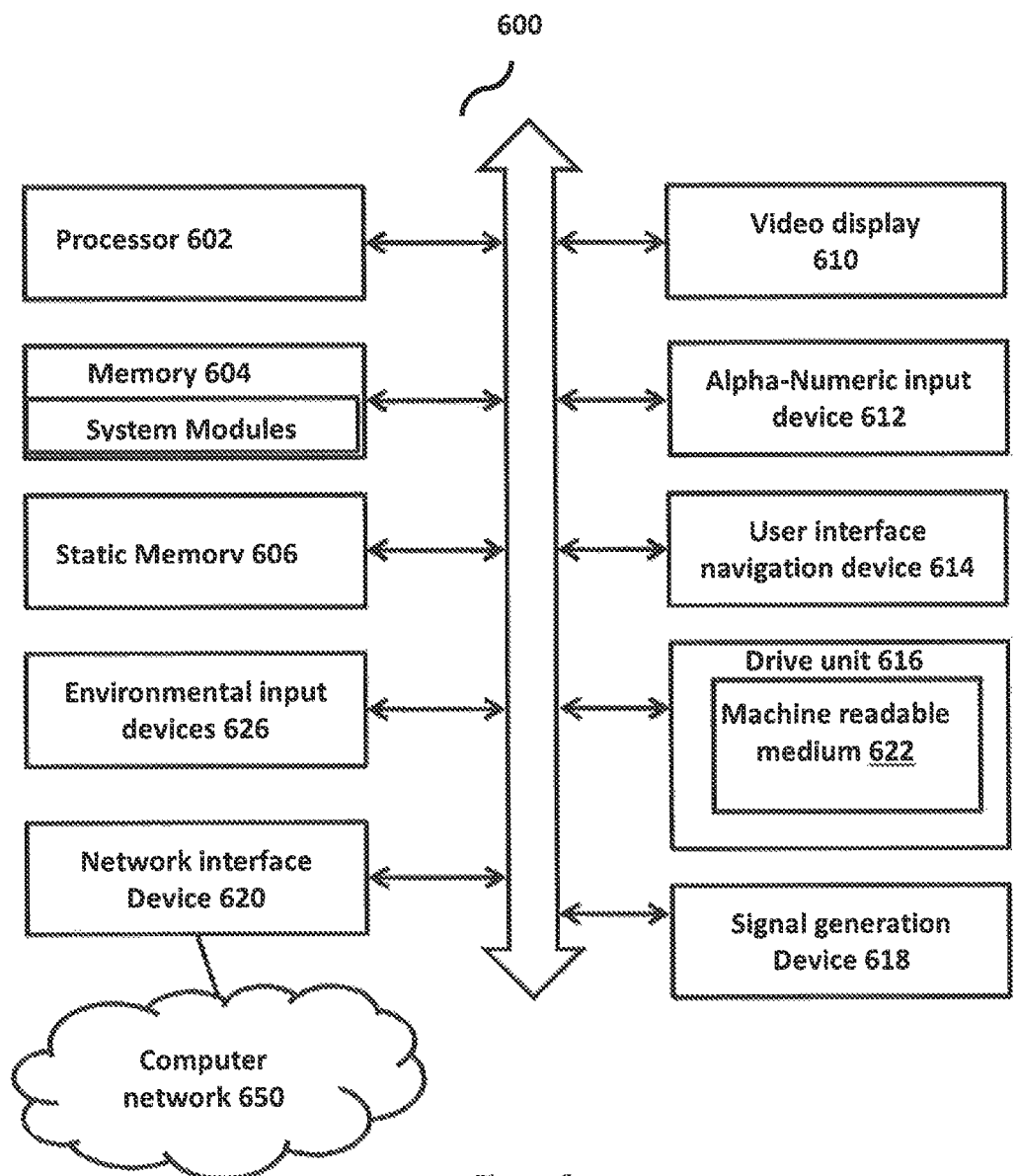
FIG. 6 is a block diagram of a machine in the example form of a computer system 600 within which instructions for causing the machine to perform any one or more of the methodologies discussed herein may be executed, according to the embodiments as disclosed herein.

FIG. 6 is a block diagram of a computer system 600 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU), or both), a main memory 604, and a static memory 606, which communicate with each other via a bus. The computer system 600 may further include a video display unit 610. The computer system 600 also includes an alphanumeric input device 612 (e.g., a keyboard), system modules 614 (including without limitation, the mobile application management module. Authentication module and access module), a disk drive unit 616, a signal generation device 618 (e.g., a speaker), and a network interface device 620. The computer system 600 may also include an environmental input device 626 that may provide a number of inputs describing the environment in which the computer system 600 or another device exists, including, but not limited to, any of a Global Positioning Sensing (GPS) receiver, a temperature sensor, a light sensor, a still photo or video camera, an audio sensor (e.g., a microphone), a velocity sensor, a gyroscope, an accelerometer, and a compass.

Medium

The disk drive unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.
Transmission Medium The instructions 624 may further be transmitted or received over a computer network 650 using a transmission medium. The instructions 624 may be transmitted using the network interface device 620 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standards 802.11, 802.11a, 802.11b, 802.11e, 802.11g, 802.11i, and 1802.11n). In one example, signals from the computer can be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as, an output device such as a monitor, printer, or transmitter, for example.

Various figures of the present application include block diagrams, flowcharts and control flow illustrations of methods, systems and program products according to the invention, it will be understood that each block or step of the block diagram, flowchart and control flow illustration, and combinations of blocks in the block diagram, flowchart and control flow illustration, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustration support combinations of means for performing the specified functions, combinations of steps for performing the specified functions and program instruction means for performing the specified functions. It will also be understood that each block or step of the block diagram, flowchart or control flow illustration, and combinations of blocks or steps in the block diagram, flowchart or control flow illustration, can be implemented by special purpose hardware-based computer systems which perform the specified functions or steps, or combinations of special purpose hardware and computer instructions.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A computer implemented method executed at least in part on a system, for authenticating and controlling access to customer data by a mobile agent comprising:
   receiving by a mobile application management module, mobile agent login request from an agent device and a customer authentication request from a customer device using a pre-installed mobile application wherein unique identification data of agent device and customer device is pre-stored;
   receiving by a location match module, geo-spatial location of the agent device and the customer device and performing geo-spatial location match for the agent device and the customer device;
   generating by a session key generator module, a session key which is valid for pre-determined duration of a meeting session and dividing the session key into two parts wherein one part is sent to the agent device and other part to the customer device wherein the session key is generated and sent only if location match is found between the agent device and customer device;
   entering the received parts of session key into agent device and customer device by mobile agent and customer respectively and comparing by a session key verification module, the entered session key with the generated session key by the session key generator module;
   comparing by an ID match module, the unique identification data of agent device and customer device stored with identification data of agent device and customer device used for entering the session key; and
   granting access by an access module to mobile agent through agent device only if the location match, session key match and identification data match for the agent device and customer device is found.

2. The method of claim-1, wherein the session key is valid for the meeting session scheduled for a pre-determined duration between the mobile agent and the customer.

3. The method of claim-1, wherein the generated session key is alphanumeric or alphabetical string.

4. The method of claim-1, wherein the generated session key is an even numbered string or an odd numbered string.

5. The method of claim-1, wherein the generated session key is divided into two equal halves.

6. The method of claim-1, wherein the generated session key is divided into two unequal halves.

7. The method of claim-1, wherein the identification data registered on remote server includes IMEI (international mobile equipment identity) number, SIM number and IMSI number for the agent device and customer device.

8. The method of claim-1, wherein failure of location match between agent device and the customer device leads to denial of access of mobile agent to customer data.

9. The method of claim-1, wherein failure of identification data match of agent device stored on remote server with the agent device used for entering part of session key leads to denial of access of mobile agent to customer data.

10. The method of claim-4, wherein failure of identification data match of customer device stored on remote server with the customer device used for entering part of session key leads to denial of access of mobile agent to customer data.

11. The method of claim-1, additional comprising:
   receiving by the location match module, geo-spatial location of agent device and customer device during pendency of meeting session;

in response to receiving, conducting geo-spatial location match of agent device and customer device by location match module during pendency of meeting session; and continuing the access of mobile agent to customer data by the access module only if the location match is found.

12. The method of claim-11, wherein the location match during pendency of meeting session is conducted over pre-determined intervals of time.

13. The method of claim-11, wherein the access of mobile agent to customer data is revoked if the location match is not found.

14. The method of claim-1, additionally comprising:
receiving, a prompt on the customer device, an indication of meeting session nearing expiration of duration;
receiving an extension request by the access module sent through the customer device;
receiving in response an acceptance of extension request on the access module by the mobile agent through agent device;
receiving over a the location match module, geospatial location of the agent device and the customer device and conducting a geo-spatial location match for the agent device and customer device; and
granting continued access during extended meeting session by access module to the mobile agent only if the location match is found.

15. The method of claim-14, wherein the access of mobile agent to customer data is revoked after expiration of meeting session.

16. The method of claim-14, wherein the access of mobile agent to customer data is revoked if location match is not found during extended meeting session.

17. A system for authenticating and controlling access to customer data by a mobile agent comprising:
a memory storing instructions;
a processor coupled to the memory to;
receive by a mobile application management module, mobile agent login request from an agent device and a customer authentication request from a customer device using a pre-installed mobile application wherein unique identification data of agent device and customer device is pre-stored;
receive by a location match module, geo-spatial location of the agent device and the customer device and performing geo-spatial location match for the agent device and the customer device;
generating by a session key generator module, a session key which is valid for pre-determined duration of a meeting session and dividing the session key into two parts wherein one part is sent to the agent device and other part to the customer device wherein the session key is generated and sent only if location match is found between the agent device and customer device;
entering the received parts of session key into agent device and customer device by mobile agent and customer respectively and comparing by a session key verification module, the entered session key with the generated session key by the session key generator module;
comparing by an ID match module, the unique identification data of agent device and customer device stored with identification data of agent device and customer device used for entering the session key; and
granting access by an access module to mobile agent through agent device only if the location match, session key match and identification data match for the agent device and customer device is found.

18. A computer program product for authenticating and controlling access of mobile agent to customer data, the computer program product comprising a non-transitory computer-readable storage medium having computer-readable program code portions stored therein, the computer-readable program code portions comprising:
a first executable portion for receiving mobile agent login request and customer authentication request;
a second executable portion for receiving gee-spatial location of agent device and customer device and performing a location match between agent device and customer device;
a third executable portion for generating a session key and dividing the session key into two parts and sending the parts to agent device and customer device only if the location match is found;
a fourth executable portion for comparing the entered session key with the generated session key;
a fifth executable portion for comparing pre-stored unique identification data with the identification data of agent device and customer device; and
a sixth executable portion for granting access to mobile agent only if the location match, session key match and identification data match is found for agent device and customer device.

* * * * *